(No Model.) 3 Sheets—Sheet 1.
C. N. DUTTON.
FLUID METER.
No. 460,084. Patented Sept. 22, 1891.
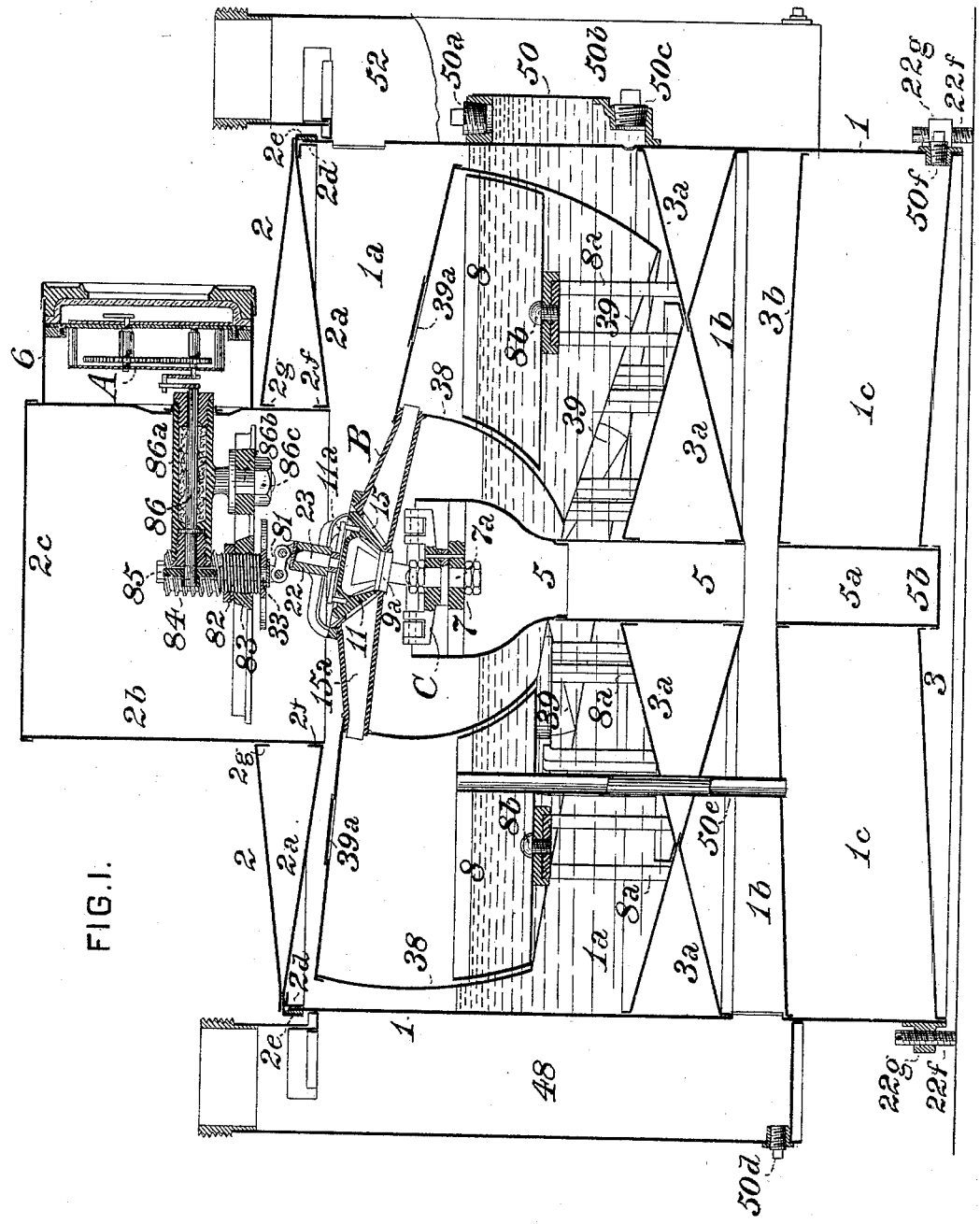
FIG. I.
WITNESSES:
R H Whittesey
F. E. Gaither
INVENTOR,
Chauncey N. Dutton,
by Snowden Bell,
Att'y.

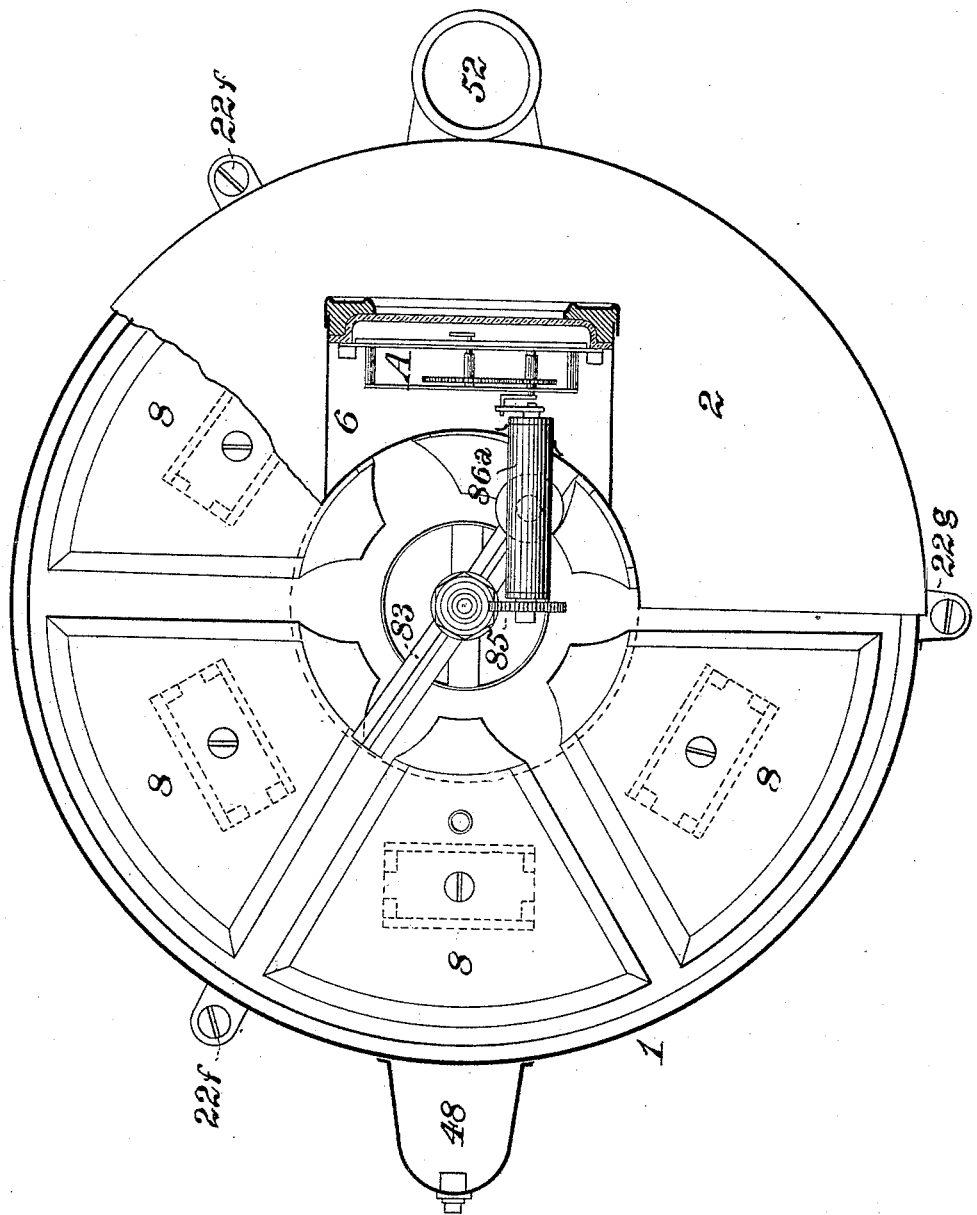

(No Model.) 3 Sheets—Sheet 3.
C. N. DUTTON.
FLUID METER.
No. 460,084. Patented Sept. 22, 1891.
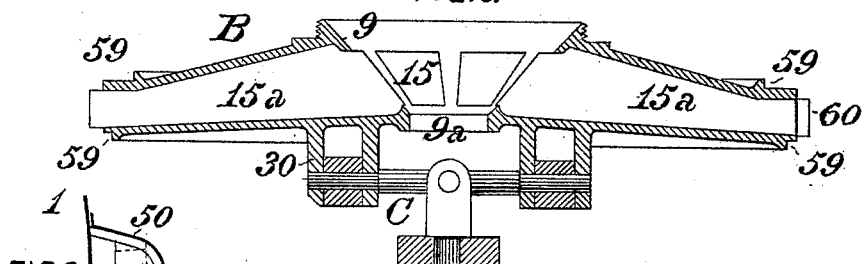
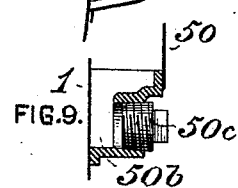
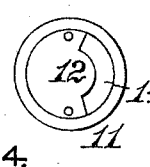
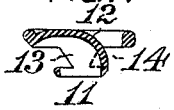
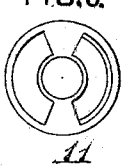
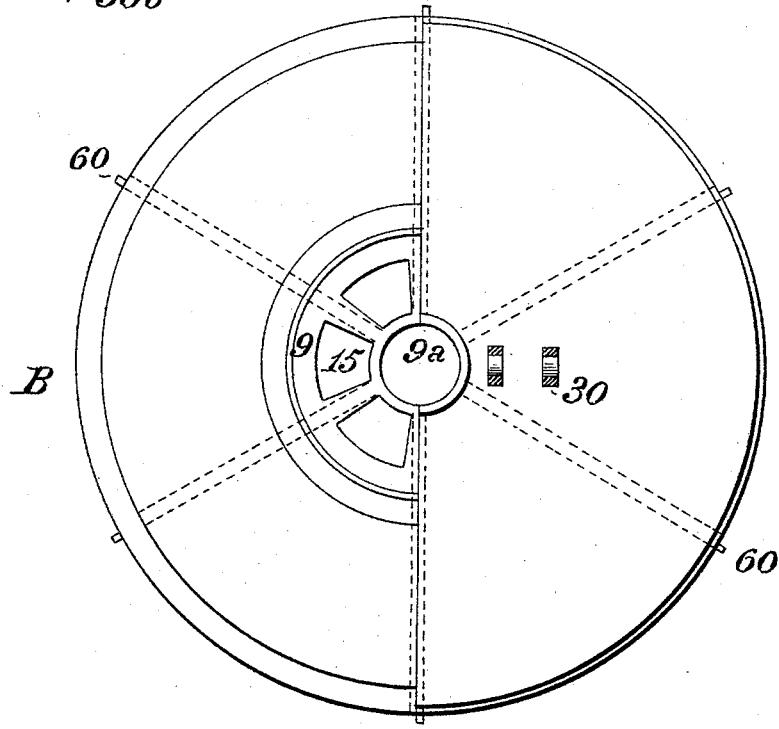
WITNESSES:
R. H. Whittlesey
F. E. Gaither
INVENTOR,
Chauncey N. Dutton,
by J. Snowden Bell,
Att'y.

UNITED STATES PATENT OFFICE.

CHAUNCEY N. DUTTON, OF PITTSBURG, PENNSYLVANIA, ASSIGNOR TO THE FUEL GAS AND MANUFACTURING COMPANY, OF SAME PLACE.

FLUID-METER.

SPECIFICATION forming part of Letters Patent No. 460,084, dated September 22, 1891.

Application filed October 16, 1890. Serial No. 368,342. (No model.)

*To all whom it may concern:*

Be it known that I, CHAUNCEY N. DUTTON, a citizen of the United States, residing at Pittsburg, in the county of Allegheny and State of Pennsylvania, have invented or discovered certain new and useful Improvements in Fluid-Meters, of which improvements the following is a specification.

My invention relates to improvements in fluid-meters, more particularly of the class or type set forth in Letters Patent of the United States No. 400,420, granted and issued to George Westinghouse, Jr., and myself under date of March 26, 1889, and in Letters Patent of the United States No. 441,614, granted and issued to the Fuel Gas and Manufacturing Company, as my assignee, under date of November 25, 1890.

The construction set forth in each of said Letters Patent provides a cast-metal inclosing case containing a centrally-pivoted librating measuring mechanism and a sealing-fluid, and was specially designed to furnish a meter suitable for the measurement of natural gas in large volumes and at high pressures or under conditions involving the liability of the meter being suddenly subjected to a high pressure. For this reason the case or shell was formed of cast-iron, making a comparatively heavy meter, the weight of which, while not objectionable in meters designed for the use above mentioned, is undesirable in those which measure illuminating-gas, the latter never being subjected to high pressure, and consequently not requiring to be made of great strength.

The object of my present invention is to produce a meter for illuminating-gas which shall embody the features of durability, simplicity, economy, and accuracy of the meters before referred to, together with lightness of construction and smoothness and delicacy of operation, which are particularly desirable in illuminating-gas meters.

The improvements claimed consist in certain novel devices and combinations embodied in the structure thereof, all as hereinafter fully set forth.

In the accompanying drawings, Figure 1 is a vertical central section through an illuminating-gas meter constructed in accordance with my invention; Fig. 2, a plan or top view with the measuring-vessel and a portion of the cover removed and the register-case in section; Fig. 3, a vertical central section on an enlarged scale through the port-section; Fig. 4, a view showing on the left a plan and on the right a bottom elevation of the same; Fig. 5, a plan view of the valve; Fig. 6, a bottom view of the same; Fig. 7, a transverse section through the same; Fig. 8, a horizontal section through the main drainage-plug chamber, and Fig. 9 a vertical section through the same.

In the practice of my invention I provide a cylindrical sheet-metal case 1, which is closed at its top by a cap or cover composed of an outer conical annular plate 2, of sheet metal, and a reversely-inclined inner conical annular plate $2^a$, which are connected peripherally to the case 1 and are connected at their inner edges to a central-seamed sheet-metal cylinder $2^b$, which is sufficiently large to admit the hand of an operator and is provided with a cap $2^c$. The inner cover-plate $2^a$ is provided with a downwardly-projecting peripheral flange $2^e$ for attachment to the case 1, adjacent to which there is a flat annular surface, which rests upon a lining-ring $2^d$, of L-section, secured to the inside of the case 1 at its top. The case is closed at its lower end by a bottom plate 3, and is supported upon vertical screw-threaded bolts $22^f$, which engage lugs $22^g$, connected to the outer surface of the case, and provide for the leveling of the meter by their proper longitudinal adjustment.

The interior of the meter-case is divided into three compartments by a bed-plate $3^a$ and a floor-plate $3^b$, interposed between the bed-plate and the bottom plate 3 of the case. The upper compartment $1^a$ contains the measuring mechanism and sealing-fluid, the middle compartment or gallery $1^b$ serves as an inlet-passage, and the bottom compartment or overflow-chamber $1^c$ receives any excess of sealing-fluid which may be supplied to the measuring-mechanism compartment, such excess being delivered to the overflow-chamber through a vertical pipe $50^e$ and being drawn off as required by means of a removable drainage-plug 50$^f$. A supply-pipe 48 for the inflow of the fluid to be measured opens into the gallery 1$^b$, and a discharge-pipe 52 for the delivery of the measured fluid is connected to the opposite side of the casing, opening into the measuring-mechanism compartment 1$^a$ near its top. Threaded ends or nozzles for the attachment of conducting-pipes are formed on the pipes 48 and 52. The bed-plate 3$^a$, which serves as the support of the measuring mechanism, is designed to be so braced as to provide ample strength with a minimum of weight. To this end it is composed of a series of sheets secured together so as to form an annular braced plate, preferably of X-section, as shown, which is secured at its periphery to the shell of the meter and at its inner edges to a central tube 5, which is open at its lower end to the gallery 1$^b$ and extends upwardly therefrom into the measuring-mechanism compartment 1$^a$, its upper end, which supports the mechanism chamber, being outwardly curved or tapered. Equalizing-chambers 8, corresponding in number with the compartments of a measuring-shell 38, to be presently described, are arranged in a circular series concentric with the tube 5, and are supported upon the upper ends of standards 8$^a$, fixed upon the top of the bed-plate 3$^a$. A lateral filling-tube 50 is connected to the chamber 1$^a$ for the introduction of sealing-fluid to said chamber and is closed at top by a removable plug 50$^a$. The lower end of the tube 50 opens into a drainage-chamber 50$^b$ and communicates through said chamber with an opening in the case adjacent to the top of the bed-plate 3$^a$. A removable drainage-plug 50$^c$ is fitted in the drainage-chamber at or near its bottom, and a similar plug 50$^d$ is fitted in the lower portion of the supply-pipe 48. A central tube 5$^a$, which is closed at bottom by a removable plate 5$^b$, passes through the overflow-chamber 1$^c$, being secured at its ends to the bottom plate 3 and floor-plate 3$^b$, said tube serving to give access to the universal-joint mechanism when desired.

The sheet-metal measuring shell or vessel 38 is, similarly to those of the Letters Patent aforesaid, substantially in the form of an annular section of a sphere, divided radially by partitions 39 into a series of measuring-compartments, the lower ends of which are open and immersed in the sealing-fluid which is supplied to the compartment 1$^a$, each compartment inclosing one of the equalizing-chambers 8. The compartments are each completely closed at top, and an opening, which is closed by a plate 39$^a$, is formed in the top of each compartment to admit of the attachment of the equalizing-chambers to their standards 8$^a$ in fitting up the meter. The central portion of the measuring-shell is closed at top by a port-section B, connected thereto, which will be presently described, and is supported and its axis maintained uniformly at a fixed angle with the vertical axis of the meter, so that its direct oscillation shall, as in the Letters Patent aforesaid, be prevented and be converted into a "libratory" or progressive wave-like movement by a universal-joint mechanism C, connected centrally to the lower side of the port-section B, and connected by a bolt 7$^a$ to a transverse support 7, fixed in the central tube 5 near its top. The axis of the measuring-shell is maintained at a fixed angle with that of the meter by the connection of a valve-shaft 23, journaled on the port section B, with a shaft 33, journaled in a bearing fixed to the meter-case in line axially therewith and above the measuring-shell. An indicating and registering mechanism A of any suitable and preferred construction is mounted in a register-chamber 6, connected to one side of the upper central cylinder 2$^b$ of the case, and is actuated, through interposed gearing and connections, by the rotation of the shaft 33.

In a meter for the measurement of illuminating-gas it is essential that the measuring mechanism shall be very delicately poised and as nearly as possible free from inertia, as the meter is required to measure very minute volumes, and must, further, be unaffected by the sudden turning on or off of the gas, so as to permit such action without causing other flames burning at such times to jump or flicker. The valve mechanism by which gas is admitted to and discharged from the several compartments of the measuring-shell 38 is designed to comply with the above requirements, and in this instance consists of a rotary valve 11, the shaft 23 of which is coupled to the shaft 33 and is rotated therewith in and by the movements of the measuring-shell, said valve-controlling ports and passages leading from its seat in the port-section B to the several compartments of the measuring-shell. The port-section B is a light casting of circular form and of such diameter as to fit truly into the top of the central opening of the measuring-shell 38, to the inner wall of which it is peripherally secured, as in my application aforesaid. To facilitate the connection of the port-section and measuring-shell, annular collars 59 are formed upon the periphery of the port-section at its top and bottom, and vertical ribs 60 are adapted to abut against the partitions of the measuring-shell. Lugs 30 are formed upon the lower side of the port-section, through which lugs the port-section and the attached measuring-shell 38 are coupled to a universal-joint mechanism C, connected to the fixed support 7.

The universal-joint mechanism does not differ in substantial particulars from that of Letters Patent No. 441,614 aforesaid, and, not forming in and of itself part of my present invention, need not be herein at length described.

A central conical valve seat or face 9 is formed in the port-section B, its wall tapering outwardly and upwardly from a lower central inlet-port 9$^a$ and being provided with ports 15, each leading into one of a series of sector-formed chambers or compartments 15ª, located between the upper and lower walls of the port-section, said compartments corresponding in number with those of the measuring-shell, and each of them communicating at its periphery with one of the measuring-shell compartments. A conical valve 11 is fitted to rotate on and control the ports of the valve-face 9, said valve being coupled by a yoke 11ª to a valve-shaft 23, which is journaled in a bearing 22, having downwardly-projecting arms secured to the top of the port-section. A partition 12, extending across the valve from its upper to its lower opening, divides it into supply and exhaust or charging and discharging sides or passages 13 and 14, which in the rotation of the valve are alternately brought into communication through the ports 15 with each of the compartments 15ª of the port-section and the communicating compartments of the measuring-shell 38. The upper end of the valve-shaft 23 is coupled by a link 81 to a register-driving shaft 33, which is journaled in line axially with the meter in a bearing 82, which is connected to and longitudinally adjustable in a support 83, fixed to the upper central cylinder 2ᵇ of the case. The shaft 33 carries a worm 84, engaging a worm-wheel 85 on a horizontal shaft 86, which passes through a suitable stuffing-box 86ª into the register-chamber 6 and rotates a crank on the first-motion shaft of the indicating and registering mechanism A, which is located therein. In order to facilitate the securing of the stuffing-box in proper relation with the worm 84, so that the worm and worm-wheel may mesh correctly, the stuffing-box is provided with a threaded and collared stem 86ᵇ perpendicular to its axis and parallel to the axis of the shaft 33. The stem 86ᵇ passes through an opening in the support 83 and is fixed therein by a nut 86ᶜ. The stuffing-box is turned on the axis of the stem 86ᵇ until the worm-wheel 85 is in proper engagement with the worm 84, and the stem is then fixed to retain the stuffing-box in such position by the nut 86ᶜ.

The operation of the meter in the supply and discharge of gas from the supply-pipe to and from the several compartments of the measuring-shell and thence to the discharge pipe is similar to that of the meters set forth in the Letters Patent aforesaid, and need not, therefore, be again herein described. When the meter is to be put in operation, the gas-service pipes are connected to the nozzles of the inlet and discharge pipes 48 and 52, the charging-plug 50ª is removed, and the meter is charged with sealing-fluid to the top of the equalizing-chambers. Any excess of sealing-fluid which may be supplied will pass off through the tube 50ᵉ to the overflow-chamber 1ᶜ, whence it can be readily removed. The gas being now turned on, the meter operates in effecting its measurement similarly to the meters set forth in the Letters Patent aforesaid.

I claim as my invention and desire to secure by Letters Patent—

1. In a fluid-meter, the combination of a sheet-metal inclosing case, a laterally-braced sheet-metal bed-plate connected to the case, inlet and discharge pipes connected to the case, and measuring mechanism connected to and supported by the bed-plate independently of the case, substantially as set forth.

2. In a fluid-meter, the combination of a sheet-metal inclosing case, a bed-plate connected to said case, inlet and discharge pipes connected to said case, measuring mechanism connected to and supported by the bed-plate independently of the case, and a laterally-braced sheet-metal cover connected to and closing the top of the case, substantially as set forth.

3. In a fluid-meter, the combination of a sheet-metal inclosing case, a bottom plate closing said case at its lower end, a floor-plate connected to the case above the bottom plate, a laterally-braced bed-plate connected to the case above the floor-plate, inlet and discharge pipes connected to the case and opening thereinto on opposite sides of the bed-plate, and measuring mechanism connected to and supported by the bed-plate independently of the case, substantially as set forth.

4. In a fluid-meter, the combination of a sheet-metal inclosing case, a braced sheet-metal bed-plate connected to the case, inlet and discharge pipes connected to the case, an annular spherical sector measuring-shell divided into a series of separate compartments and coupled to a support fixed to the bed-plate, a series of standards secured to the bed-plate, and equalizing-chambers secured to said standards, each equalizing-chamber fitting freely within a compartment of the measuring-shell, substantially as set forth.

5. In a fluid-meter, the combination of an inclosing case, inlet and discharge pipes connected to the case, an annular spherical sector measuring-shell divided into a series of separate compartments, a port-section fitting into and closing the central space within the measuring-shell at its top, said port-section being divided into a series of radial compartments, each communicating directly with a compartment of the measuring-shell, a rotary valve fitting a central face in the port-section and controlling-ports in the several compartments thereof, a driving-shaft coupled to the valve and journaled in a bearing on the port-section, a link coupling said shaft to a shaft mounted in a bearing connected to the meter-case in line with its axis, and a universal-joint mechanism coupled to the port-section and coupled in line with the axis of the meter to a support fixed to the meter-case, substantially as set forth.

6. In a fluid-meter, the combination of an inclosing case, inlet and discharge pipes connected to the case, measuring mechanism supported upon the case, a worm-shaft journaled on the case and coupled to the measuring mechanism, a worm fixed on said shaft, a stuffing-box having a stem located at right angles to its axis and connected adjustably to a support on the case, a register-driving shaft adapted to rotate in said stuffing-box, and a worm-wheel fixed upon said shaft and adapted to engage the worm, substantially as set forth.

7. In a fluid-meter, the combination of a sheet-metal inclosing case, a braced sheet-metal annular bed-plate formed of oppositely-inclined members connected one to another, the bed-plate being connected peripherally to the case, inlet and discharge pipes connected to the case on opposite sides of the bed-plate, a central tube connected to the bed-plate, and measuring mechanism coupled to a support fixed to said central tube, substantially as set forth.

8. In a fluid-meter, the combination of an inclosing case, a bed-plate connected to said case, inlet and discharge pipes connected to said case, measuring mechanism connected to and supported by the bed-plate, a cover formed of a braced annular plate connected peripherally to the case, a central chamber connected to the cover, and register-driving mechanism mounted on supports fixed in said central chamber, substantially as set forth.

9. In a fluid-meter, the combination of a sheet-metal inclosing case, a bottom plate closing said case at its lower end, a floor-plate connected to the case above the bottom plate and forming the upper wall of an overflow-chamber and the lower wall of a gallery or inlet-chamber, a bed-plate connected to the case above the floor-plate and forming the upper wall of the gallery and the lower wall of a measuring-mechanism chamber, inlet and discharge pipes connected to the gallery and to the measuring-mechanism chamber, respectively, and measuring mechanism connected to and supported by the bed-plate, substantially as and for the purpose set forth.

In testimony whereof I have hereunto set my hand.

CHAUNCEY N. DUTTON.

Witnesses:
J. SNOWDEN BELL,
R. H. WHITTLESEY.